(12) United States Patent
Kuschmeader et al.

(10) Patent No.: US 8,141,760 B2
(45) Date of Patent: Mar. 27, 2012

(54) HITCH-MOUNTED CARRIER

(75) Inventors: Luke Kuschmeader, Battlefield, MO (US); Brian Atkinson, Springfield, MO (US)

(73) Assignee: Kuat Innovations, Inc., Springfield, MO (US)

( * ) Notice: Subject to any disclaimer, the term of this patent is extended or adjusted under 35 U.S.C. 154(b) by 669 days.

(21) Appl. No.: 12/288,709

(22) Filed: Oct. 22, 2008

(65) Prior Publication Data

US 2010/0096424 A1    Apr. 22, 2010

(51) Int. Cl.
*B60D 1/155* (2006.01)
*B60D 1/28* (2006.01)

(52) U.S. Cl. ........ 224/497; 224/506; 224/521; 224/924; 280/506

(58) Field of Classification Search .................. 224/497, 224/506, 509, 519, 521, 924; 280/506
See application file for complete search history.

(56) References Cited

U.S. PATENT DOCUMENTS

| | | | | |
|---|---|---|---|---|
| 5,190,195 | A * | 3/1993 | Fullhart et al. ................. | 224/497 |
| 5,344,175 | A * | 9/1994 | Speer ............................ | 280/506 |
| 6,234,372 | B1 * | 5/2001 | Rivera .......................... | 224/536 |
| 6,283,349 | B1 * | 9/2001 | Morris et al. ................. | 224/537 |
| 6,655,562 | B2 * | 12/2003 | Jeong ............................ | 224/282 |
| 6,951,287 | B1 * | 10/2005 | Randazzo ....................... | 211/17 |
| 6,974,147 | B1 * | 12/2005 | Kolda ........................... | 280/506 |
| 2007/0145088 | A1 * | 6/2007 | Depot ........................... | 224/519 |

* cited by examiner

*Primary Examiner* — Justin Larson
*Assistant Examiner* — Adam Waggenspack
(74) *Attorney, Agent, or Firm* — Lathrop & Gage LLP (57) ABSTRACT

Hitch-mounted carriers, including portable bicycle racks, are set forth herein. One carrier includes a height member, an insert arm coupled to height member for movement between storage and use configurations, and at least one support arm coupled to height member for movement between storage and use configurations. Means for coupling insert arm to a tow hitch, for locking insert arm at storage and use configurations, and for locking support arm(s) at storage and use configurations are included. Insert arm is configured for insertion in tow hitch and has a wedge aperture. An attaching element is coupled to support arm(s) for removably attaching a device to support arm(s). A wedge is adjacent wedge aperture, and means are included for moving wedge between a first position generally flush with or inside insert arm and a second position extending outside insert arm to dampen wobble between insert arm and tow hitch.

18 Claims, 10 Drawing Sheets

HITCH-MOUNTED CARRIER

BACKGROUND

The present invention relates generally to portable racks, and specifically to hitch-mounted carriers.

Bicycles, skis, snowboards, and other large devices often must be transported to a location before being used for travel or recreation. As it is often impractical, undesirable, or impossible to carry these items inside a vehicle, various racks have been created for coupling these items to vehicles for exterior travel. These prior art racks are typically mounted to a vehicle's cabin roof, trunk, or tow hitch.

Novel and unobvious hitch-mounted carriers are set forth herein, as will be evident from reviewing the description below and the accompanying drawings.

SUMMARY

According to one embodiment, a hitch-mounted carrier includes a height member, an insert arm, and at least one support arm. The height member has opposed first and second ends. The insert arm is rotatably coupled to the height member first end for movement between storage and use configurations; the insert arm and height member are generally parallel when the insert arm is at the storage configuration and generally perpendicular when the insert arm is at the use configuration. The insert arm is configured for insertion in a tow hitch and has a wedge aperture. Means for coupling the insert arm to the tow hitch and means for temporarily locking the insert arm at the storage and use configurations are included. The at least one support arm is rotatably coupled to the height member second end for movement between storage and use configurations; the support arm and height member are generally parallel when the support arm is at the storage configuration and generally perpendicular when the support arm is at the use configuration. Means for temporarily locking the support arm at the storage and use configurations are included. At least one attaching element is coupled to the at least one support arm for removably attaching a device to the at least one support arm. A wedge is adjacent the insert arm wedge aperture, and means are included for moving the wedge between a first position generally flush with or inside the insert arm and a second position extending outside the insert arm to dampen wobble between the insert arm and the tow hitch.

According to another embodiment, a portable bicycle rack includes an elongate height member having upper and lower ends, an insert arm configured for insertion in a tow hitch and having a wedge aperture, and a first bracket fixedly attached to the insert arm. The first bracket defines a channel generally perpendicular to the insert arm, and the first bracket is rotatably coupled to the height member lower end to allow the insert arm to move between storage and use configurations. The insert arm and height member are generally parallel when the insert arm is at the storage configuration, and the height member is generally parallel to the first bracket channel when the insert arm is at the use configuration. A wedge is adjacent the insert arm wedge aperture, and means are included for moving the wedge between a first position allowing the insert arm to be moved in and out of the tow hitch and a second position dampening wobble between the insert arm and the tow hitch. A movable pin is configured to pass through apertures in at least one of the first bracket and the height member to selectively maintain the insert arm at the storage and use configurations. At least one support arm has at least one attaching element for removably attaching a bicycle to the at least one support arm. A second bracket is fixedly attached to the at least one support arm, and the second bracket defines a channel generally perpendicular to the at least one support arm. The second bracket is rotatably coupled to the height member upper end to allow the at least one support arm to move between storage and use configurations; the at least one support arm and height member are generally parallel when the at least one support arm is at the storage configuration, and the height member is generally parallel to the second bracket channel when the at least one support arm is at the use configuration. A movable pin is configured to pass through apertures in at least one of the second bracket and the height member to selectively maintain the at least one support arm at the storage and use configurations.

According to yet another embodiment, a portable bicycle rack includes an elongate height member having upper and lower ends. An insert arm is rotatably coupled to the height member lower end for movement between storage and use configurations; the insert arm and height member are generally parallel when the insert arm is at the storage configuration and generally perpendicular when the insert arm is at the use configuration. The insert arm is configured for insertion in a tow hitch and has a wedge aperture. At least one support arm is rotatably coupled to the height member upper end for movement between storage and use configurations; the support arm and height member are generally parallel when the support arm is at the storage configuration and generally perpendicular when the support arm is at the use configuration. At least one attaching element is coupled to the at least one support arm for removably attaching a bicycle to the at least one support arm. A knob is at an end of the insert arm, and a rod is coupled to the knob so that rotation of the knob causes rotation of the rod. The rod extends inside the insert arm, and at least a portion of the rod is threaded. A wedge is adjacent the insert arm wedge aperture for movement between a first position allowing the insert arm to be moved in and out of the tow hitch and a second position dampening wobble between the insert arm and the tow hitch. The wedge is coupled to the rod by threads complementary to the rod threads, and rotation of the rod causes movement of the wedge between the first and second positions through interaction between the rod threads and the wedge threads.

DETAILED DESCRIPTION

FIGS. 1 through 13 show an embodiment of a new hitch-mounted carrier 100. The hitch-mounted carrier 100 has a height member 110, an insert arm 120, and at least one support arm 140.

Figure 1:
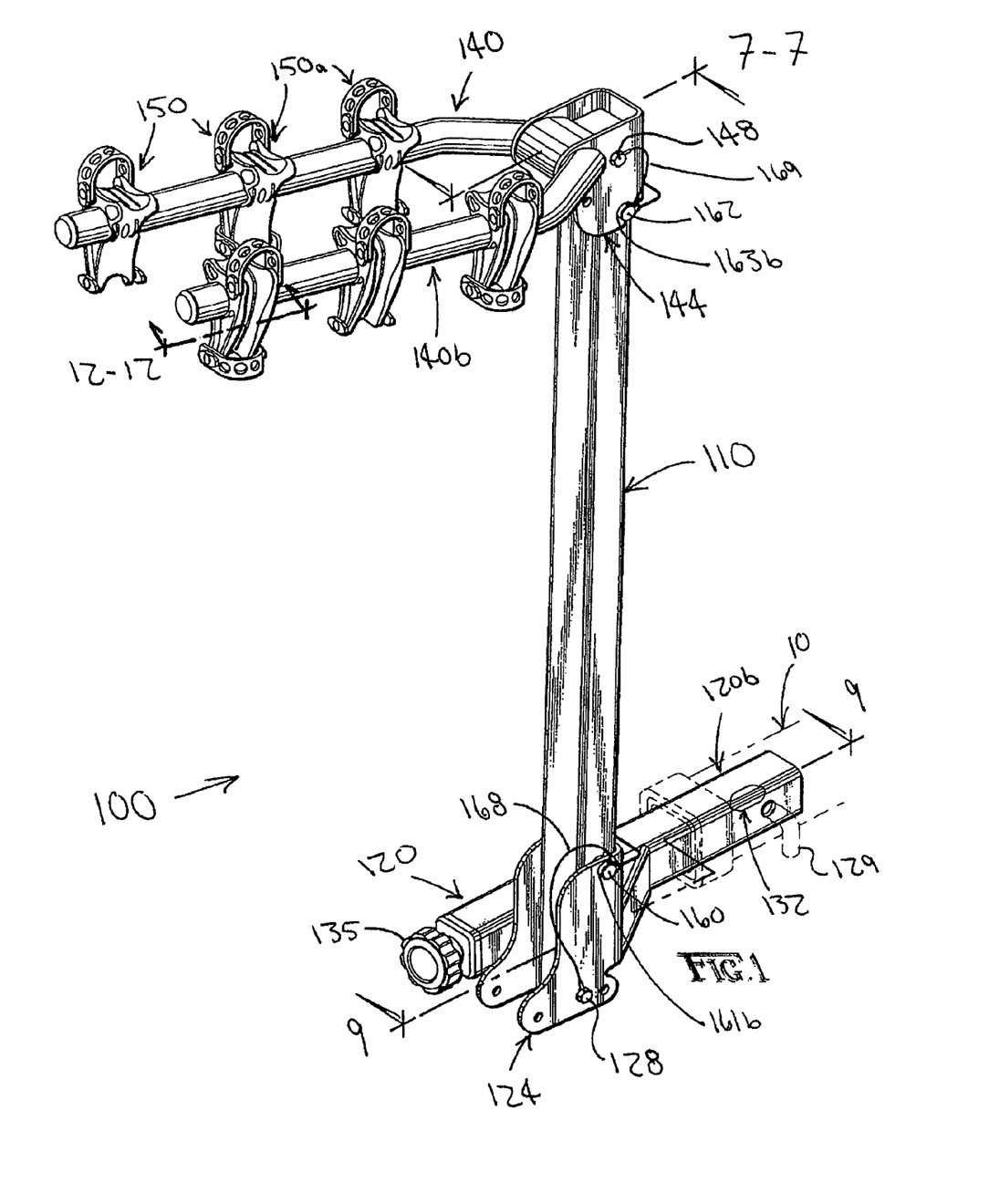
FIG. 1 is a perspective view of a hitch-mounted carrier according to an embodiment.
Figure 3:
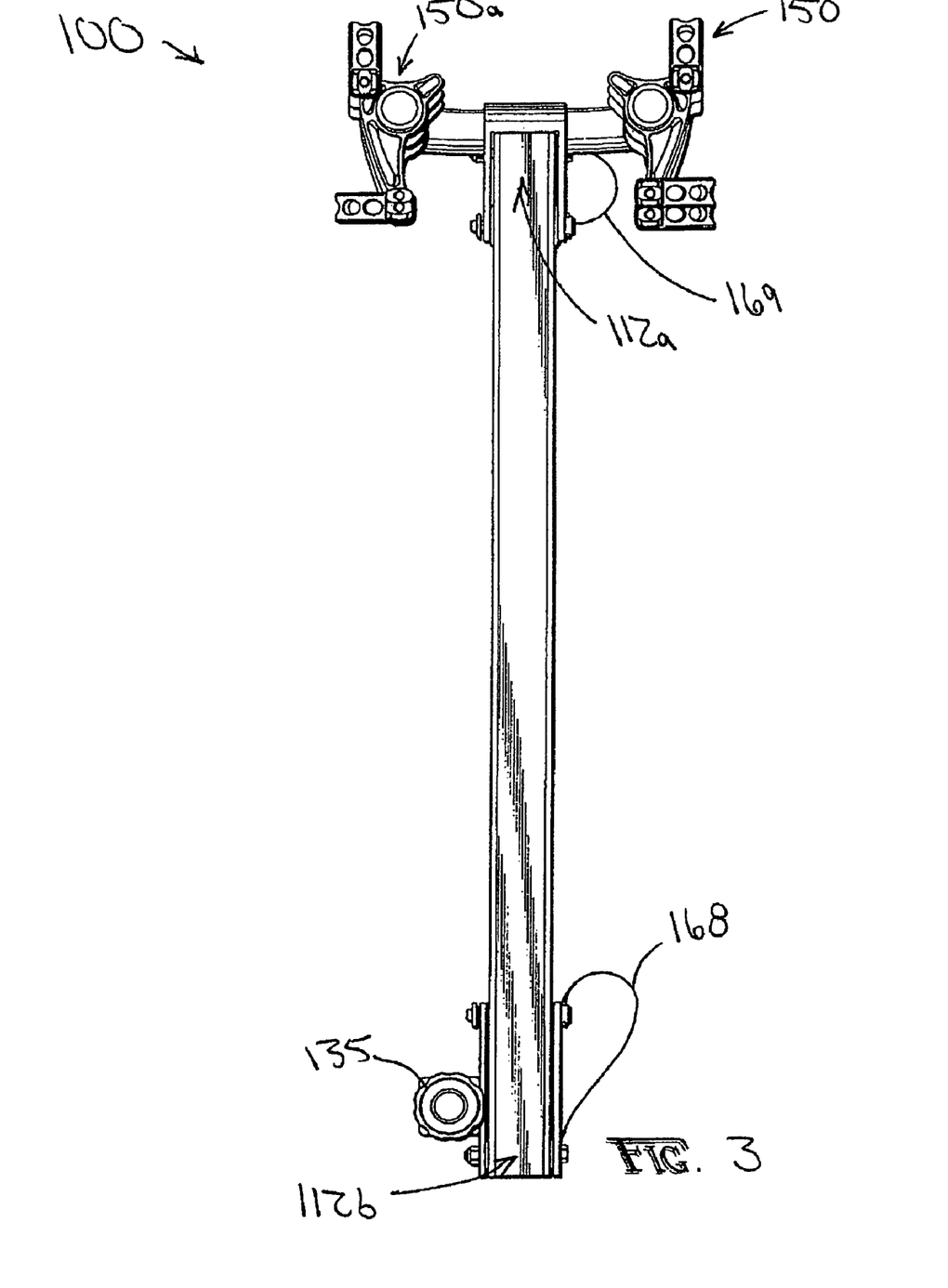
FIG. 3 is a front view of the hitch-mounted carrier of FIG. 1.
Figure 4:
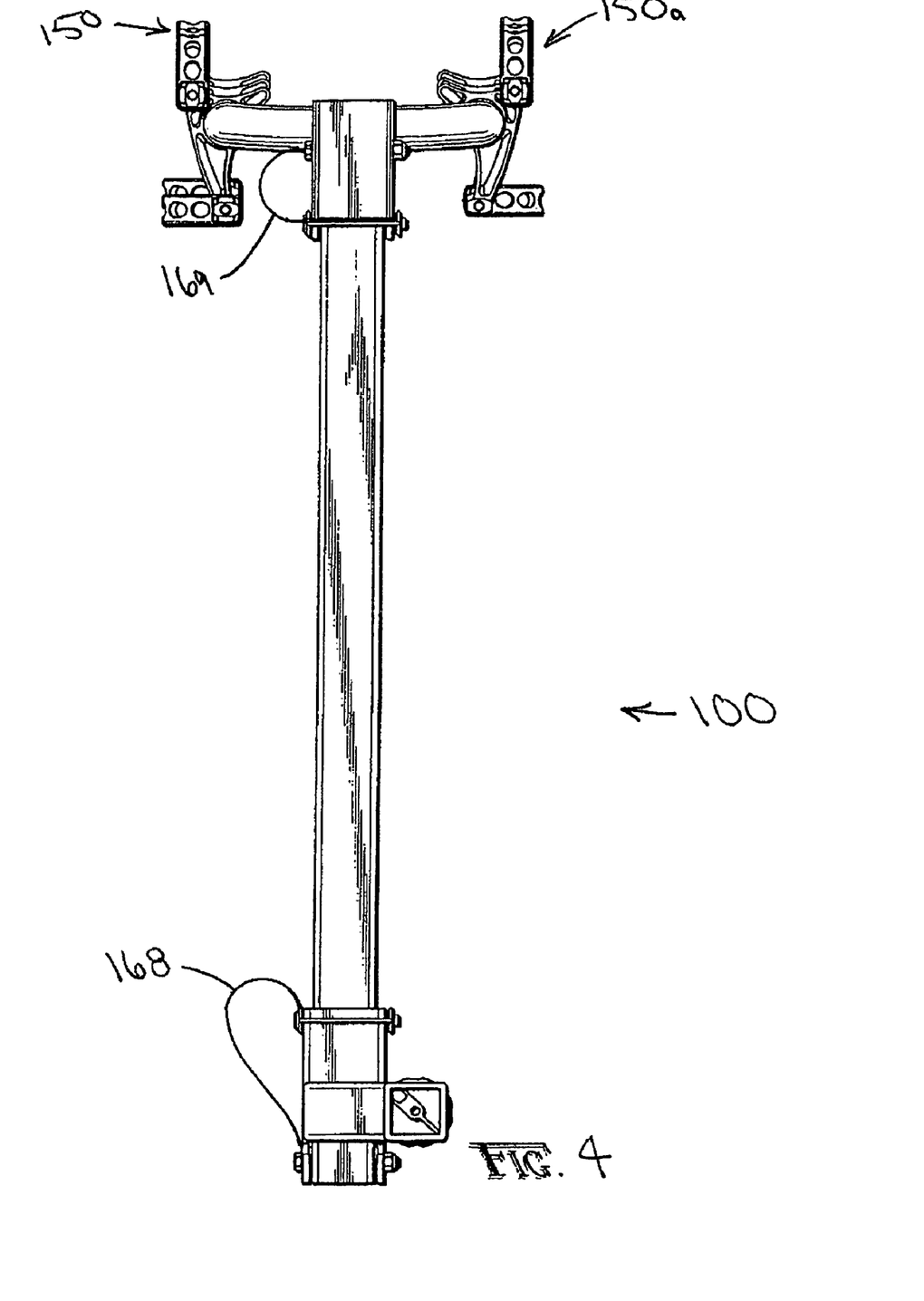
FIG. 4 is a rear view of the hitch-mounted carrier of FIG. 1.
Figure 5:
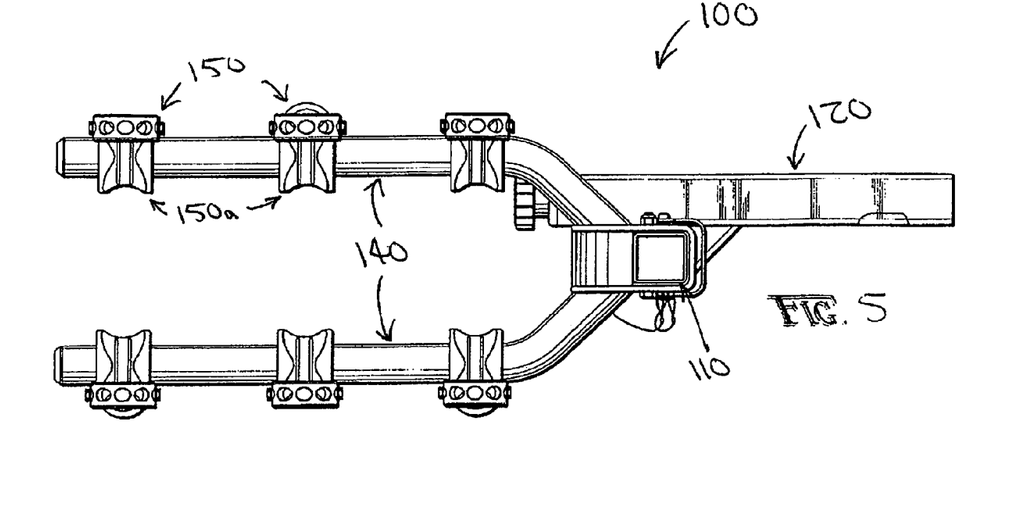
FIG. 5 is a top view of the hitch-mounted carrier of FIG. 1.
Figure 6:
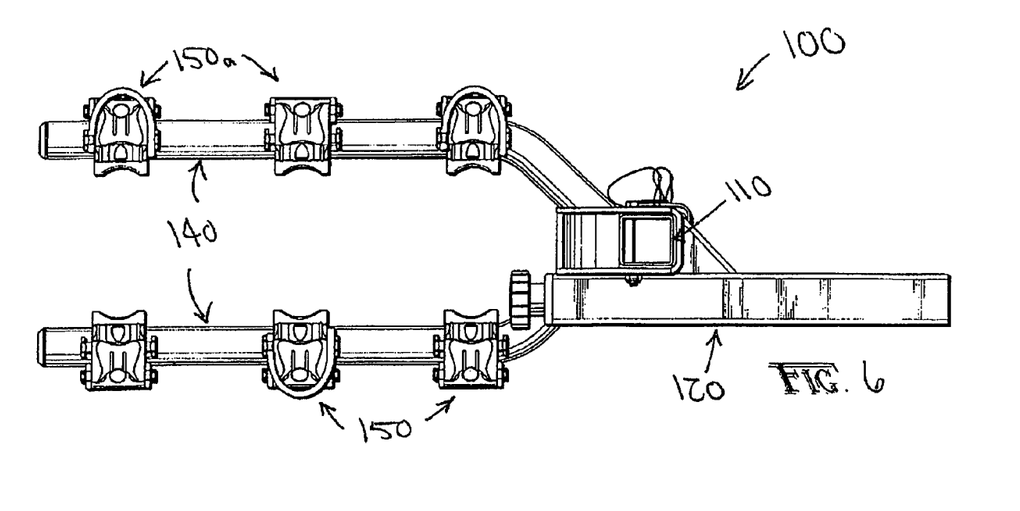
FIG. 6 is a bottom view of the hitch-mounted carrier of FIG. 1.

The height member 110 is elongate and may be generally linear, as shown in FIG. 1. The height member 110 shown in FIG. 1 is constructed of rectangular aluminum tubing, though other materials and shapes could alternately be used. It may be particularly desirable for the material to be lightweight, strong, and resistant to corrosion. As shown in FIG. 3, the height member 110 has upper and lower ends 112a, 112b. It should be appreciated that "upper end 112a" and "lower end 112b" are used herein to refer to generally opposed sides of the height member 110, and should not be limited to the actual extremities of the height member 110.

Figure 2:
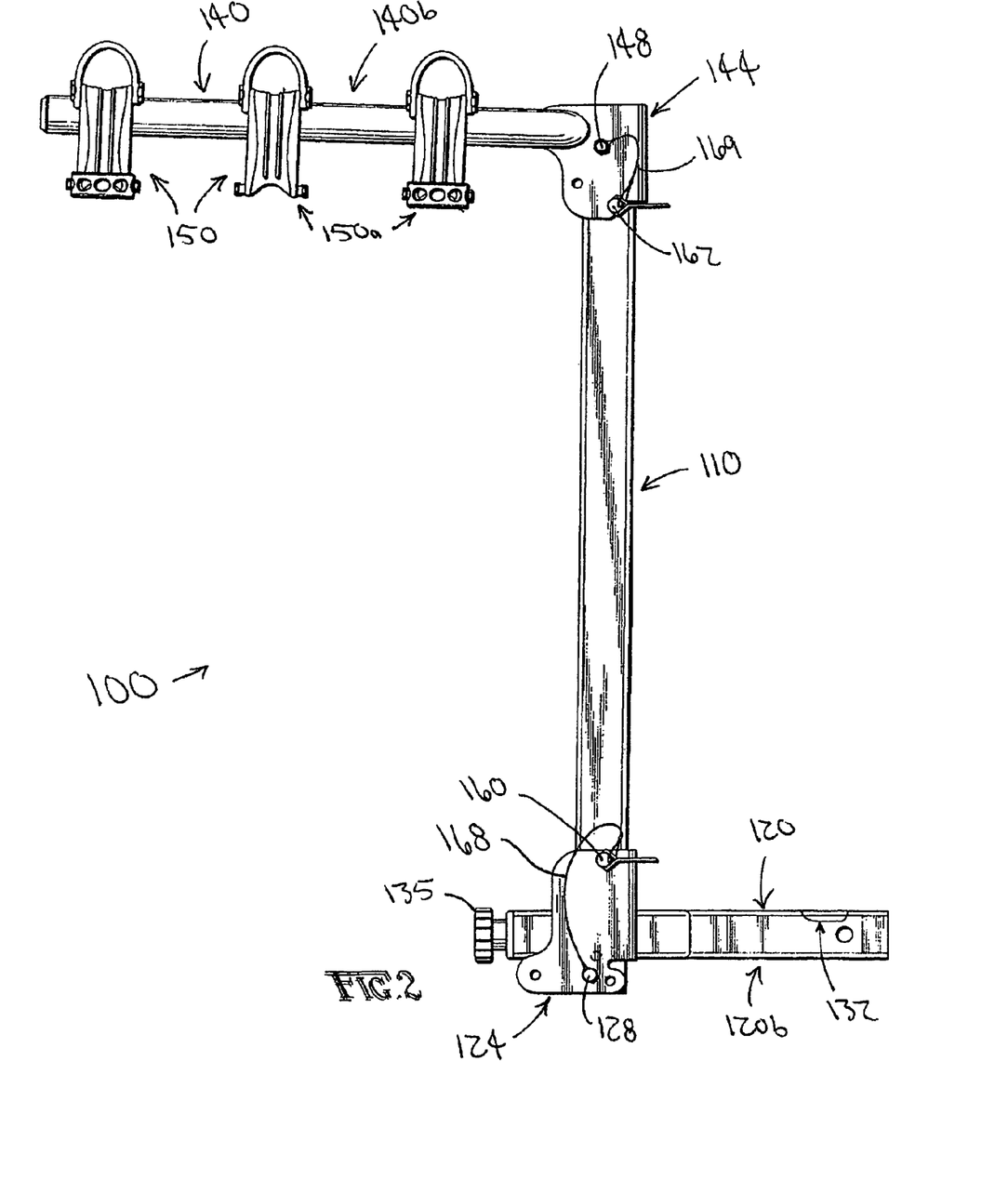
FIG. 2 is a side view of the hitch-mounted carrier of FIG. 1.
Figure 11:
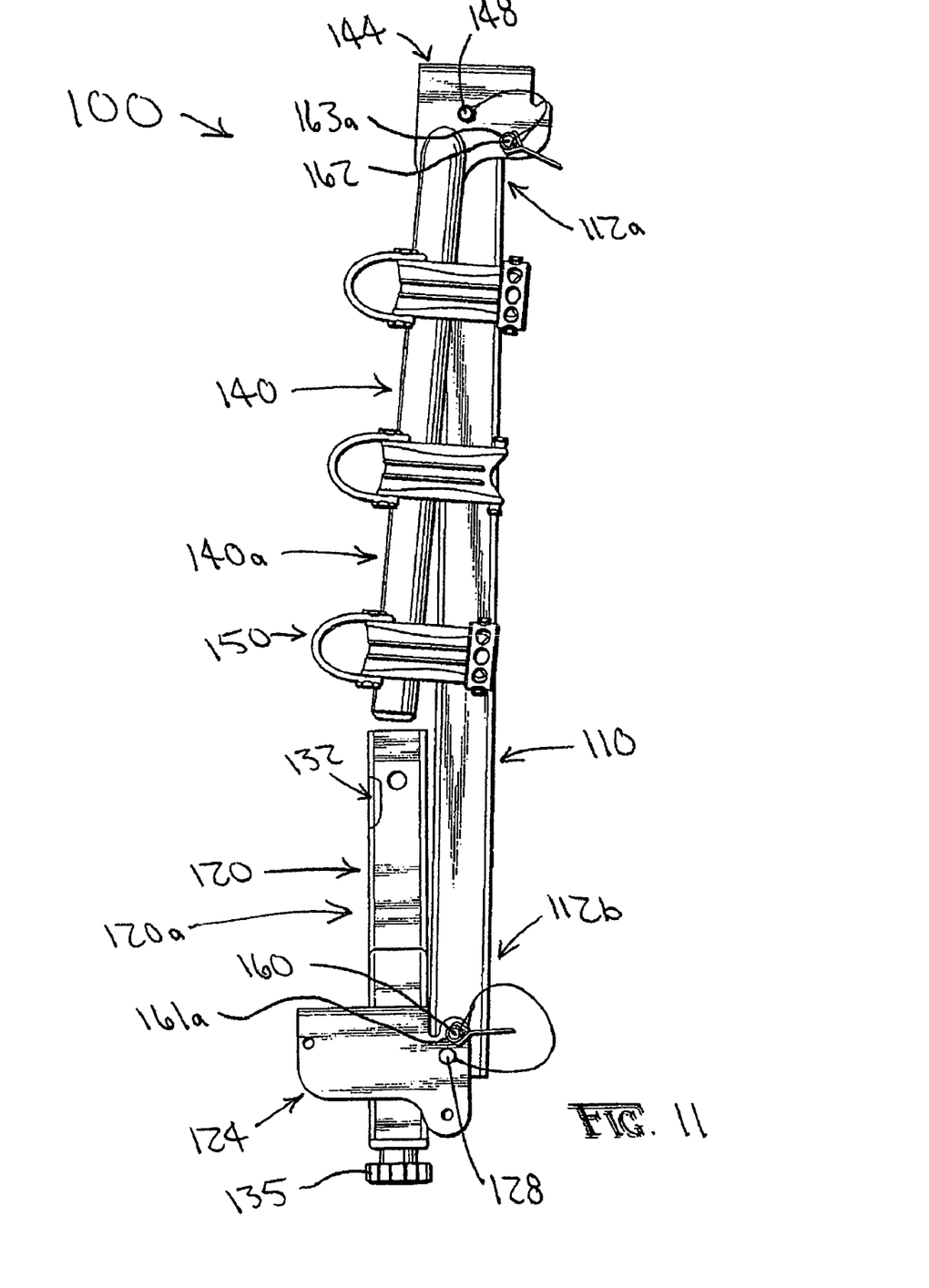
FIG. 11 is a side view of the hitch-mounted carrier of FIG. 1, shown in an alternate configuration.

As shown in FIG. 1 and FIG. 11, the insert arm 120 is rotatably coupled to the lower end 112b of the height member 110 for movement between a storage configuration 120a (FIG. 1) and a use configuration 120b (FIG. 1). When at the storage configuration 120a, the insert arm 120 and the height member 110 are generally parallel (e.g., offset by no more than about fifteen degrees). The actual angle between the insert arm 120 and the height member 110 when at the storage configuration 120a is important only as an indicator of how compact the hitch-mounted carrier 100 can be. When at the use configuration 120b, the insert arm 120 is generally perpendicular to the height member 110 (e.g., offset between about seventy degrees to about one hundred and ten degrees). In some embodiments, as shown in FIG. 2, the insert arm 120 may be offset approximately ninety degrees from the height member 110 when at the use configuration 120b.

Figures 9, 10:
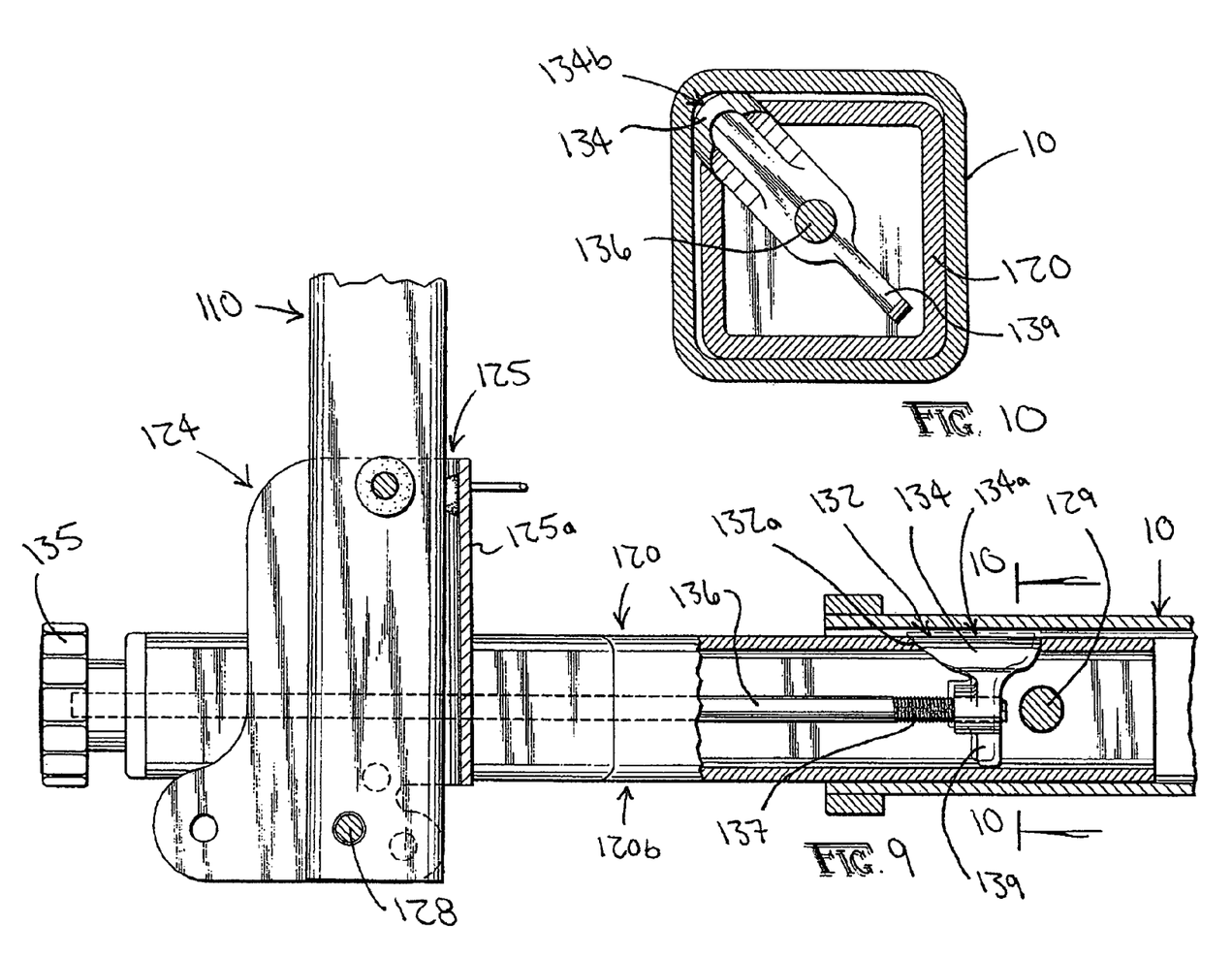
FIG. 9 is a partial view taken from FIG. 1.
FIG. 10 is a partial view taken from FIG. 9.

To rotatably couple the insert arm 120 to the height member 110, a bracket 124 (FIG. 1) may be fixedly attached to (i.e., of unitary construction with, or otherwise coupled to) the insert arm 120, and a bolt 128 may rotatably couple the bracket 124 to the lower end 112b of the height member 110. To deter theft and vandalism, the bolt 128 may be a security bolt (e.g., a rivet, a bolt requiring an uncommon wrench for removal, etc.). As shown in FIG. 9, the bracket 124 may define a channel 125 that is generally parallel to the height member 110 when the insert arm 120 is at the use configuration 120b. In some embodiments, the height member 110 may abut an endwall 125a of the channel 125 when the insert arm 120 is at the use configuration 120b.

The insert arm 120 may be constructed of rectangular aluminum tubing, though other materials and shapes could alternately be used. It may be particularly desirable for the material to be lightweight, strong, and resistant to corrosion.

As shown in FIG. 1, FIG. 9, and FIG. 10, the insert arm 120 is configured for insertion in a tow hitch 10, and a hitch pin 129 (FIGS. 1 and 10) passes through apertures in the tow hitch 10 and the insert arm 120 to couple the insert arm 120 to the tow hitch 10. The hitch pin 129 may include a locking apparatus to deter theft and vandalism by restricting the hitch pin 129 from being removed.

Still referring to FIG. 9 and FIG. 10, the insert arm 120 includes a wedge aperture 132, and a wedge 134 is adjacent the aperture 132 for movement between a first position 134a that allows the insert arm 120 to be moved in and out of the tow hitch 10 and a second position 134b (FIG. 10) to dampen wobble between the insert arm 120 and the tow hitch 10. The second position 134b is shown in FIG. 9 in dashed lines. To move the wedge 134 between the first and second positions 134a, 134b, a knob 135 is accessible at an end of the insert arm 120. The knob 135 is coupled to a rod 136 that extends inside the insert arm 120, and at least a portion of the rod 136 has threads 137. The wedge 134 is coupled to the rod 136 by threads that are complementary to the rod threads 137. Rotation of the knob 135 causes the rod 136 to rotate, and rotation of the rod 136 causes the wedge 134 to move (i.e., towards or away from the knob 135, depending on the direction that the knob 135 is rotated) due to the interaction between the rod threads 137 and the wedge threads. A brace 139 may be coupled to the wedge 134 to force the wedge 134 to move to the second position 134b as the wedge 134 is drawn toward the knob 135. Additionally, or alternately, interaction between the wedge 134 and a barrier element (e.g., a sidewall 132a of the wedge aperture 132) may force the wedge 134 to move to the second position 134b as the wedge 134 is drawn toward the knob 135. Importantly, wedge aperture 132 is preferably formed in a corner or vertice of the insert arm 120 and the wedge 134 is oriented toward the aperture 132 as best shown in FIG. 10. By placing the wedge 134 in a corner of the insert arm 120, when the wedge 134 is forced into the second position it pushes against the two adjacent walls of the aligned inner corner of the hitch 10 which causes the insert arm 120 to move away from the contact between the wedge 134 and hitch corner it engages. As shown in FIG. 10, this causes the insert arm to seat against two inner walls of the hitch 10 opposite the wedge 134.

Turning to FIG. 1 and FIG. 11, the at least one support arm 140 is rotatably coupled to the height member upper end 112a for movement between a storage configuration 140a (FIG. 11) and a use configuration 140b (FIG. 1). When at the storage configuration 140a, the support arm(s) 140 and the height member 110 are generally parallel (e.g., offset by no more than about fifteen degrees). The actual angle between the support arm(s) 140 and the height member 110 when at the storage configuration 140a is important only as an indicator of how compact the hitch-mounted carrier 100 can be. When at the use configuration 140b, the support arm(s) 140 is generally perpendicular to the height member 110 (e.g., offset between about seventy degrees to about one hundred and ten degrees). In some embodiments, as shown in FIG. 2, the support arm(s) 140 may be offset approximately ninety degrees from the height member 110 when at the use configuration 140b.

Figure 7:
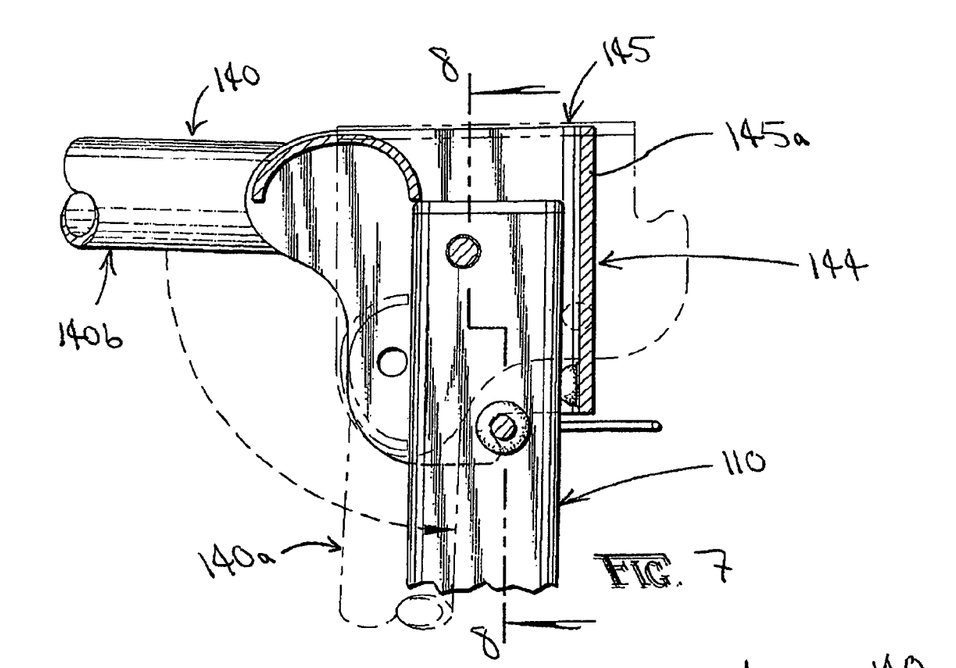
FIG. 7 is a partial view taken from FIG. 1.
Figure 8:
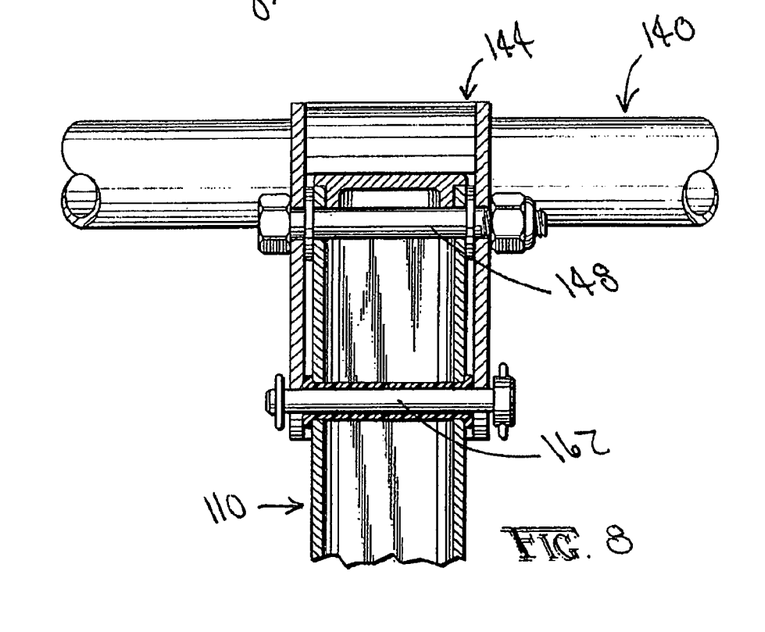
FIG. 8 is a partial view taken from FIG. 7.

To rotatably couple the support arm(s) 140 to the height member 110, a bracket 144 (FIG. 1) may be fixedly attached to (i.e., of unitary construction with, or otherwise coupled to) the support arm(s) 140, and a bolt 148 may rotatably couple the bracket 144 to the upper end 112a of the height member 110. To deter theft and vandalism, the bolt 148 may be a security bolt (e.g., a rivet, a bolt requiring an uncommon wrench for removal, etc.). As shown in FIG. 7, the bracket 144 may define a channel 145 that is generally parallel to the height member 110 when the support arm(s) 140 is at the use configuration 140b. In some embodiments, the height member 110 may abut an endwall 145a of the channel 145 when the support arm(s) 140 is at the use configuration 140b.

The support arm(s) 140 may be constructed of round aluminum tubing, though other materials and shapes could alternately be used. It may be particularly desirable for the material to be lightweight, strong, and resistant to corrosion.

As shown in FIG. 1 through FIG. 6, at least one attaching element 150 is coupled to the support arm(s) 140 for removably attaching at least one device (e.g., a bicycle, skis, snowboard, etc.) to the support arm(s) 140. The attaching elements 150 shown throughout the drawings are carriages 150a for coupling bicycles to the support arms 140. The carriages 150a may be adjustable carriages, anti-sway carriages, and/or any other appropriate carriages. It should be appreciated that while the bicycle rack 100 shown throughout the drawings has a pair of support arms 140 and carriages 150a for receiving bicycles, other types of hitch-mounted carriers 100 may have more or fewer support arms 140 and different types of attaching elements 150.

Figure 12:
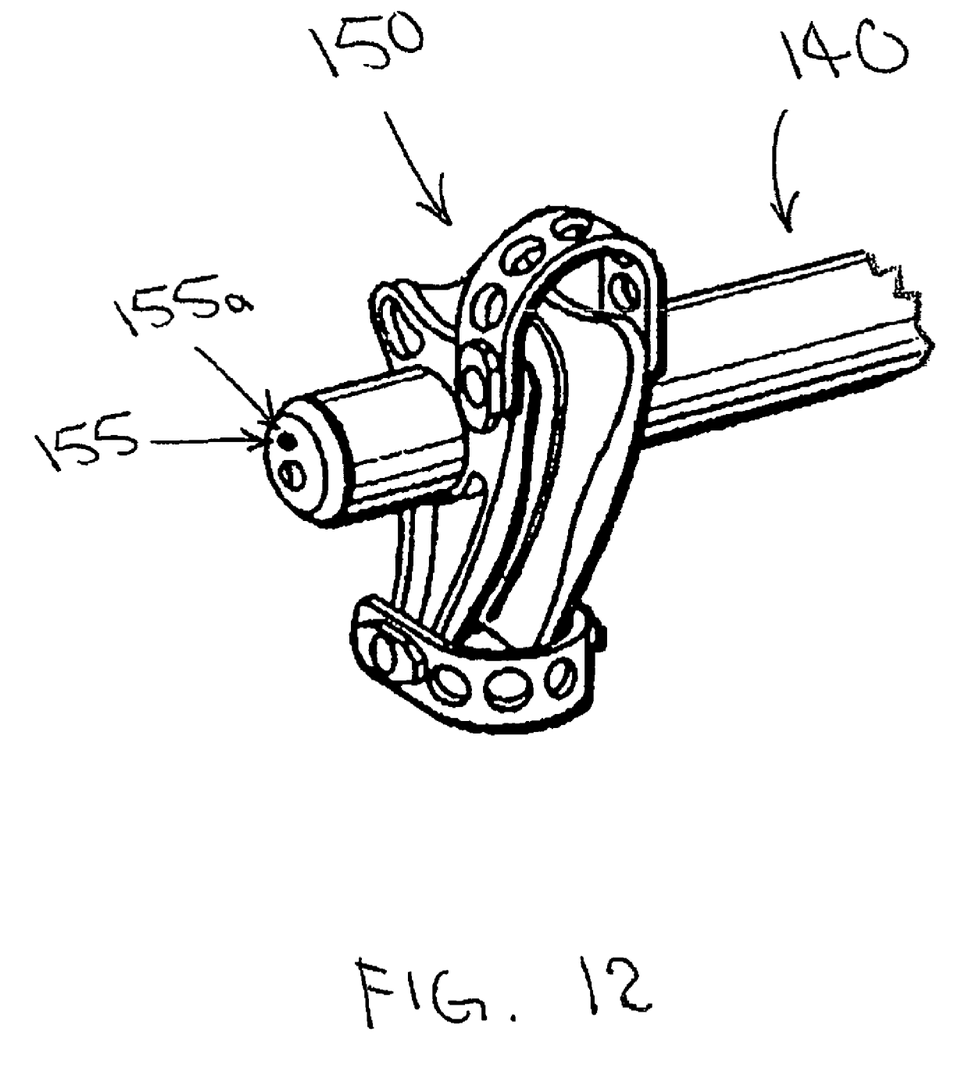
FIG. 12 is a partial view taken from FIG. 1 showing an integrated lock in a storage position.
Figure 13:
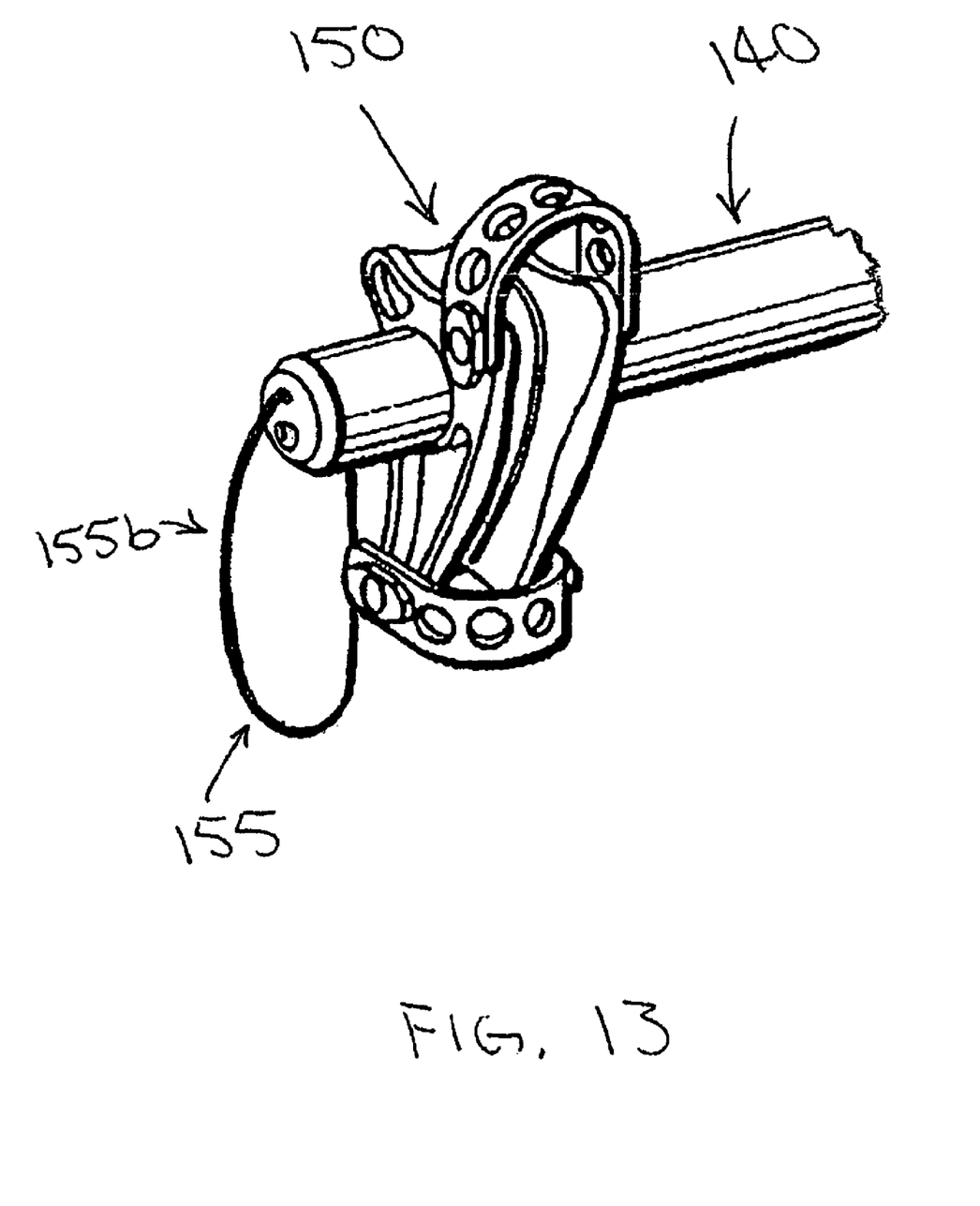
FIG. 13 is the partial view of FIG. 12, with the lock shown in a use position.

FIG. 12 and FIG. 13 illustrate an integrated lock 155 (e.g., an integrated bike lock) in a respective support arm 140. The lock 155 is movable from a storage position 155a (FIG. 12) in which the lock 155 allows access to the device (e.g., bicycle, skis, snowboard, etc.) coupled to the attaching elements 150 and a use position 155b (FIG. 13) in which the lock 155 prohibits the device coupled to the attaching element 150 from being removed from the carrier 100.

In use, the carrier 100 may be stored, transported, sold, or otherwise maintained as shown in FIG. 11 when not employed. More particularly, the insert arm 120 may be at the storage configuration 120a and the support arm(s) 140 may be at the storage configuration 140a. A movable pin 160 may pass through apertures 161a in the bracket 124 and/or the height member 110 to maintain the insert arm 120 at the storage configuration 120a. Similarly, a movable pin 162 may pass through apertures 163a in the bracket 144 and/or the height member 110 to maintain the support arm(s) 140 at the storage configuration 140a.

To utilize the carrier 100, the pin 160 may be removed from the apertures 161a, the insert arm 120 may be moved to the use configuration 120b (FIG. 1), the pin 162 may be removed from the apertures 163a, and the support arm(s) 140 may be moved to the use configuration 140b (FIG. 1). If the insert arm 120 and the support arm(s) 140 are adjacent one another when at the storage configurations 120a, 140a, as shown in FIG. 11, either the insert arm 120 or the support arm(s) 140 may be required to rotate more than one hundred and eighty degrees to move to the respective use configuration 120b, 140b, while the other (i.e., the insert arm 120 or the support arm(s) 140) rotates less than one hundred and eighty degrees to move to the respective use configuration 120b, 140b. In the embodiment shown throughout the drawings, the insert arm 120 rotates more than one hundred and eighty degrees between the storage and use configurations 120a, 120b, while the support arms 140 rotate less than one hundred and eighty degrees between the storage and use configurations 140a, 140b. The pin 160 may pass through apertures 161b in the bracket 124 and/or the height member 110 to maintain the insert arm 120 at the use configuration 120b, and the pin 162 may pass through apertures 163b in the bracket 144 and/or the height member 110 to maintain the support arm(s) 140 at the use configuration 140b. As shown in FIG. 2, a tether 168 may attach the pin 160 to the bracket 124 and a tether 169 may attach the pin 162 to the bracket 144 to keep the pins 160, 162 from being lost.

Once the insert arm 120 is at the use configuration 120b, a portion of the insert arm 120 may be inserted in the tow hitch 10, as shown in FIG. 1, FIG. 9, and FIG. 10. The hitch pin 129 may then be passed through the apertures in the tow hitch 10 and the insert arm 120 to couple the insert arm 120 to the tow hitch 10. To reduce wobble (i.e., undesired movement) between the insert arm 120 and the tow hitch 10, the knob 135 may be rotated to draw the wedge 134 toward the knob 135, forcing the wedge 134 from the first position 134a to the second position 134b as set forth above. In some embodiments, the wedge 134 is generally flush with or inside the insert arm 120 when at the first position 134a; when at the second position 134b, the wedge 134 extends outside the insert arm 120 and interacts with the tow hitch 10 (FIG. 10).

After the insert arm 120 is coupled to the tow hitch 10 and the support arm(s) 140 is at the use configuration 140b, the at least one device (e.g., bicycle, skis, snowboard, etc.) may be coupled to the support arm(s) 140 using the attaching elements 150. The lock 155 may be employed (i.e., moved to the use position 155b, as shown in FIG. 13) to interact with the device and restrict the device from being removed from the carrier 100.

When not employed, the carrier 100 may return to the compact configuration shown in FIG. 11 by generally reversing the order of the steps set forth above for utilizing the carrier 100.

Those skilled in the art appreciate that variations from the specified embodiments disclosed above are contemplated herein and that the described embodiments are not limiting. The description should not be restricted to the above embodiments, but should be measured by the following claims.

We claim:

1. A hitch-mounted carrier, comprising:
a height member having opposed first and second ends;
a rectangular insert arm rotatably coupled to the height member first end for movement between storage and use configurations, the insert arm and height member being generally parallel when the insert aim is at the storage configuration and generally perpendicular when the insert arm is at the use configuration, the insert aim, being configured for insertion in a rectangular tow hitch and having a wedge aperture formed at a corner;
a first bracket having at least two pin holes and a moveable pin for temporarily locking the insert arm at the storage and use configurations;
at least one support arm rotatably coupled to the height member second end for movement between storage and use configurations, the support arm and height member being generally parallel when the support arm is at the storage configuration and generally perpendicular when the support arm is at the use configuration;
a second bracket connecting the support arm to the height member, the bracket having at least two holes and a moveable pin for temporarily locking the support arm at the storage and use configurations;
at least one attaching element coupled to the at least one support arm for removably attaching a device to the at least one support arm;
a wedge adjacent the insert arm wedge aperture;
wherein the wedge is moveable between a first position generally flush with or inside the insert arm and a second position extending outside the insert arm and frictionally engaging an inner corner of the tow hitch to dampen wobble between the insert arm and the tow hitch;
a rotatable knob at an end of the insert arm;
a rod coupled to the knob and extending inside the insert arm, at least a portion of the rod being threaded;
threads coupled to the wedge that are complementary to the rod threads wherein rotation of the knob causes rotation of the rod and rotation of the rod causes movement of the wedge through interaction between the rod threads and the wedge threads; and
wherein at least one end of a brace coupled to the wedge or interaction between the wedge and a barrier element causes the wedge to move to the second position when the wedge threads are drawn toward the knob.

2. The hitch-mounted carrier of claim 1, wherein:
one of the insert min or the at least one support arm moves more than one hundred and eighty degrees between storage and use configurations; and
another of the insert arm or the at least one support arm moves less than one hundred and eighty degrees between storage and use configurations.

3. The hitch-mounted carrier of claim 1, wherein the at least one support arm includes an integrated bike lock.

4. The hitch-mounted carrier of claim 3, wherein:
the insert arm includes a bracket;
a security bolt rotatably couples the insert arm bracket to the height member first end;
the at least one support arm includes a bracket; and
a security bolt rotatably couples the support arm bracket to the height member second end.

5. A portable bicycle rack, comprising:
an elongate height member having upper and lower ends;
an insert aim configured for insertion in a tow hitch and having a wedge aperture formed at a corner;
a first bracket fixedly attached to the insert arm, the first bracket defining a channel generally perpendicular to the insert arm, the first bracket being rotatably coupled to the height member lower end to allow the insert arm to move between storage and use configurations, the insert arm and height member being generally parallel when the insert arm is at the storage configuration, the height member being generally parallel to the first bracket channel when the insert aim is at the use configuration;
a movable pin configured to pass through apertures in at least one of the first bracket and the height member to selectively maintain the insert arm at the storage and use configurations;
at least one support arm having at least one attaching element for removably attaching a bicycle to the at least one support;
a second bracket fixedly attached to the at least one support arm, the second bracket defining a channel generally perpendicular to the at least one support arm, the second bracket being rotatably coupled to the height member upper end to allow the at least one support arm to move between storage and use configurations, the at least one support arm and height member being generally parallel when the at least one support arm is at the storage configuration, the height member being generally parallel to the second bracket channel when the at least one support arm is at the use configuration;
a movable pin configured to pass through apertures in at least one of the second bracket and the height member to selectively maintain the at least one support arm at the storage and use configurations;
a wedge adjacent the insert aim wedge aperture;
means for moving the wedge, said means including a rotatable knob at an end of the insert arm having a rod coupled to the knob and extending inside the insert arm, at least a portion of the rod being threaded; and threads coupled to the wedge that are complementary to the rod threads so that rotation of the knob causes rotation of the rod and rotation of the rod causes movement of the wedge through interaction between the rod threads and the wedge threads such that at least one end of a brace coupled to the wedge or interaction between the wedge and a barrier element causes the wedge to move from a first position to a second position when the wedge threads are drawn toward the knob; and
wherein the wedge is moveable between the first position allowing the insert arm to be inserted into or removed out of the tow hitch and the second position where the wedge extends through the wedge aperture and frictionally engages an inner corner of the tow hitch to dampen wobble between the insert arm and the tow hitch.

6. The portable bicycle rack of claim 5, wherein the insert arm moves more than one hundred and eighty degrees between storage and use configurations.

7. The portable bicycle rack of claim 6, wherein the at least one support arm moves less than one hundred and eighty degrees between storage and use configurations.

8. The portable bicycle rack of claim 5, wherein the at least one support arm includes an integrated bike lock.

9. The portable bicycle rack of claim 8, wherein:
the first bracket is rotatably coupled to the height member lower end by a security bolt; and
the second bracket is rotatably coupled to the height member upper end by a security bolt.

10. The portable bicycle rack of claim 9, wherein:
the insert arm includes an aperture corresponding to an aperture in the tow hitch; and
a locking hitch pin passes through the tow hitch aperture and the corresponding insert arm aperture to secure the insert arm to the tow hitch.

11. The portable bicycle rack of claim 5, wherein:
the movable pin for maintaining the insert arm at the storage and use configurations is tethered to the first bracket; and
the movable pin for maintaining the at least one support arm at the storage and use configurations is tethered to the second bracket.

12. The portable bicycle rack of claim 5, wherein the at least one attaching element is at least one adjustable carriage.

13. The portable bicycle rack of claim 5, wherein the at least one attaching element is at least one anti-sway carriage.

14. The portable bicycle rack of claim 5, wherein:
one of the insert arm or the at least one support arm moves more than one hundred and eighty degrees between storage and use configurations;
another of the insert arm or the at least one support arm moves less than one hundred and eighty degrees between storage and use configurations;
the at least one support arm includes an integrated bike lock;
the first bracket is rotatably coupled to the height member lower end by a security bolt;
the second bracket is rotatably coupled to the height member upper end by a security bolt;
the insert arm includes an aperture corresponding to an aperture in the tow hitch;
a locking hitch pin passes through the tow hitch aperture and the corresponding insert arm aperture to secure the insert arm to the tow hitch;
the movable pin for maintaining the insert arm at the storage and use configurations is tethered to the first bracket; and
the movable pin for maintaining the at least one support aim at the storage and use configurations is tethered to the second bracket.

15. The portable bicycle rack of claim 5, wherein the height member, insert arm, and at least one support arm are constructed of aluminum tubing.

16. A portable bicycle rack, comprising:
an elongate height member having upper and lower ends;
an insert arm rotatably coupled to the height member lower end for movement between storage and use configurations, the insert arm and height member being generally parallel when the insert arm is at the storage configuration and generally perpendicular when the insert arm is at the use configuration, the insert arm being configured for insertion in a tow hitch and having a wedge aperture formed at one vertice;
at least one support arm rotatably coupled to the height member upper end for movement between storage and use configurations, the support arm and height member being generally parallel when the support arm is at the storage configuration and generally perpendicular when the support arm is at the use configuration;

at least one attaching element coupled to the at least one support arm for removably attaching a bicycle to the at least one support aim;

a knob at an end of the insert arm;

a rod coupled to the knob and extending inside the insert arm, at least a portion of the rod being threaded, rotation of the knob causing rotation of the rod; and a wedge adjacent the insert arm wedge aperture for movement between a first position allowing the insert arm to be moved in and out of the tow hitch and a second position where the wedge extends through the wedge aperture and frictionally engages a inner corner of the tow hitch dampening wobble between the insert arm and the tow hitch, the wedge being coupled to the rod by threads complementary to the rod threads, rotation of the rod causing movement of the wedge between the first and second positions through interaction between the rod threads and the wedge threads.

17. The bicycle rack of claim 16, wherein:

one of the insert arm or the at least one support arm moves more than one hundred and eighty degrees between storage and use configurations; and another of the insert arm or the at least one support arm moves less than one hundred and eighty degrees between storage and use configurations.

18. The bicycle rack of claim 16, wherein:

the at least one support arm includes an integrated bike lock;

the insert arm includes a bracket;

a security bolt rotatably couples the insert arm bracket to the height member lower end;

the at least one support arm includes a bracket; and a security bolt rotatably couples the support arm bracket to the height member upper end.

* * * * *